Dec. 15, 1936.　　　　J. J. KUNDIG　　　　2,063,937
FLUID PRESSURE ACTUATOR
Filed Jan. 10, 1931　　　8 Sheets-Sheet 1
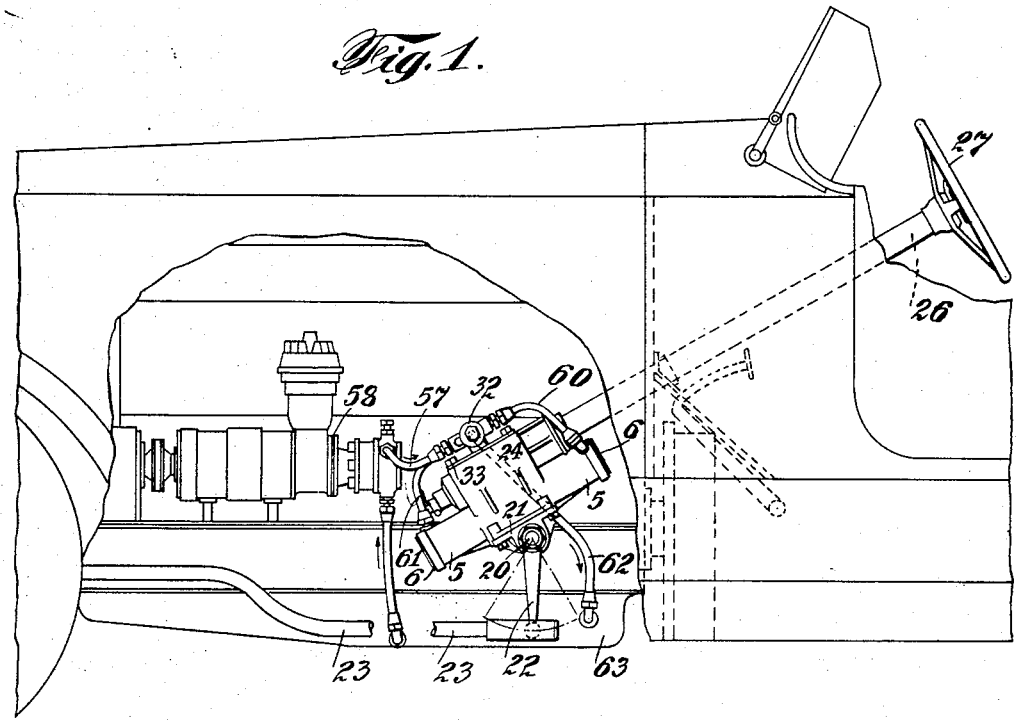
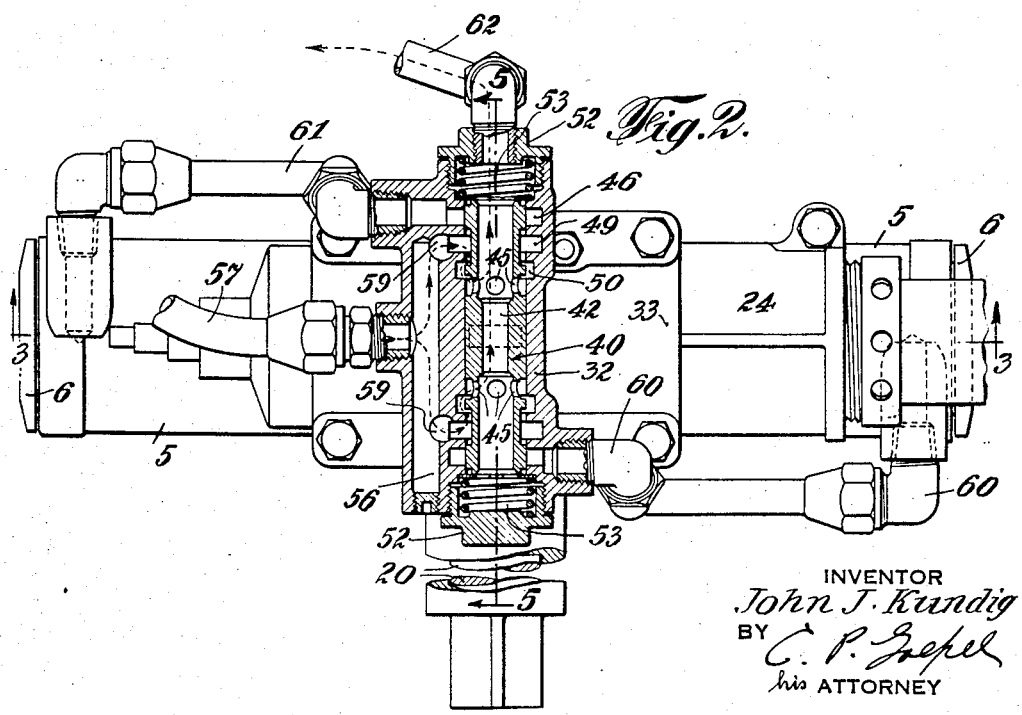
INVENTOR
John J. Kundig
BY
his ATTORNEY

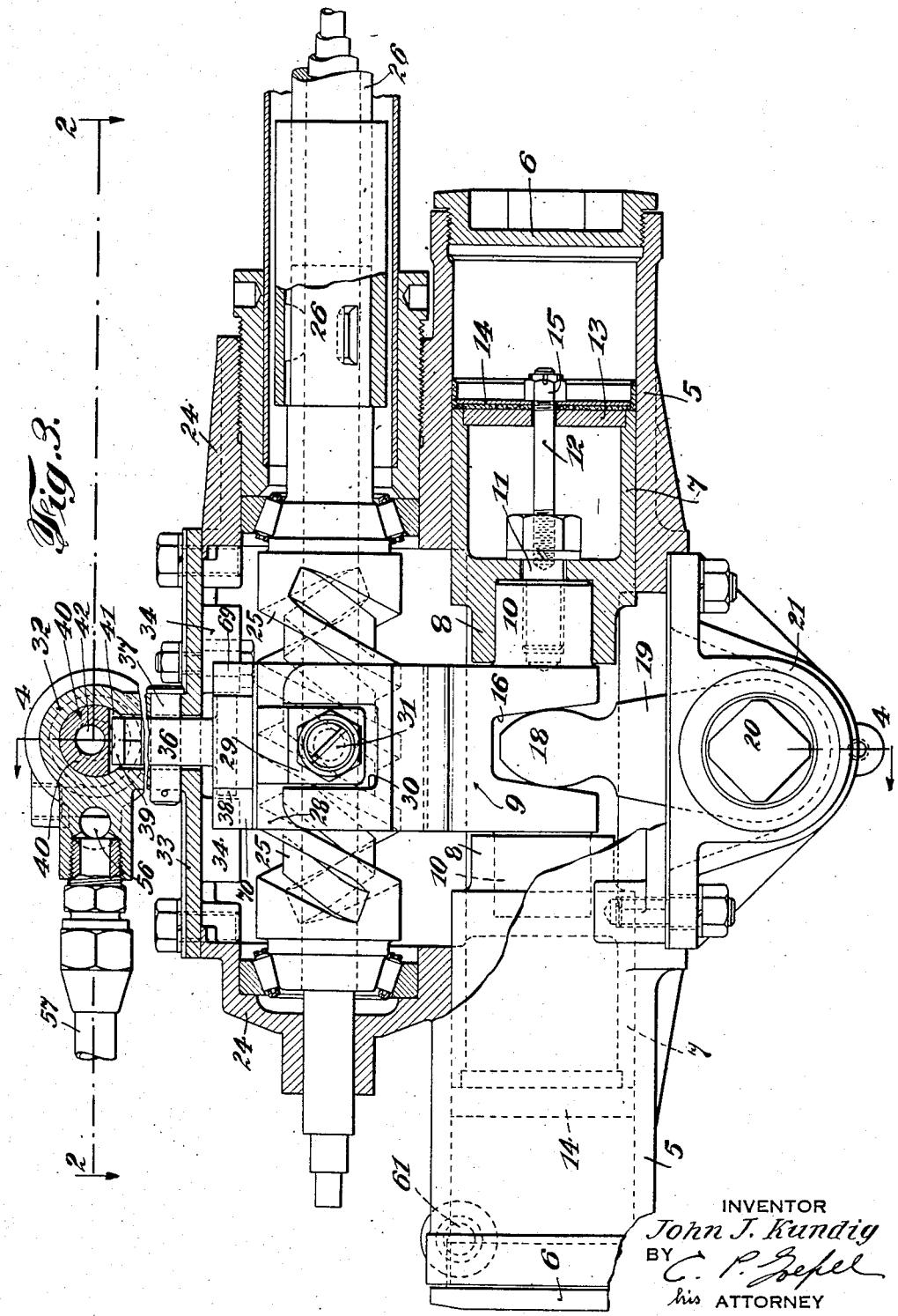

Dec. 15, 1936.  J. J. KUNDIG  2,063,937
FLUID PRESSURE ACTUATOR
Filed Jan. 10, 1931  8 Sheets-Sheet 3
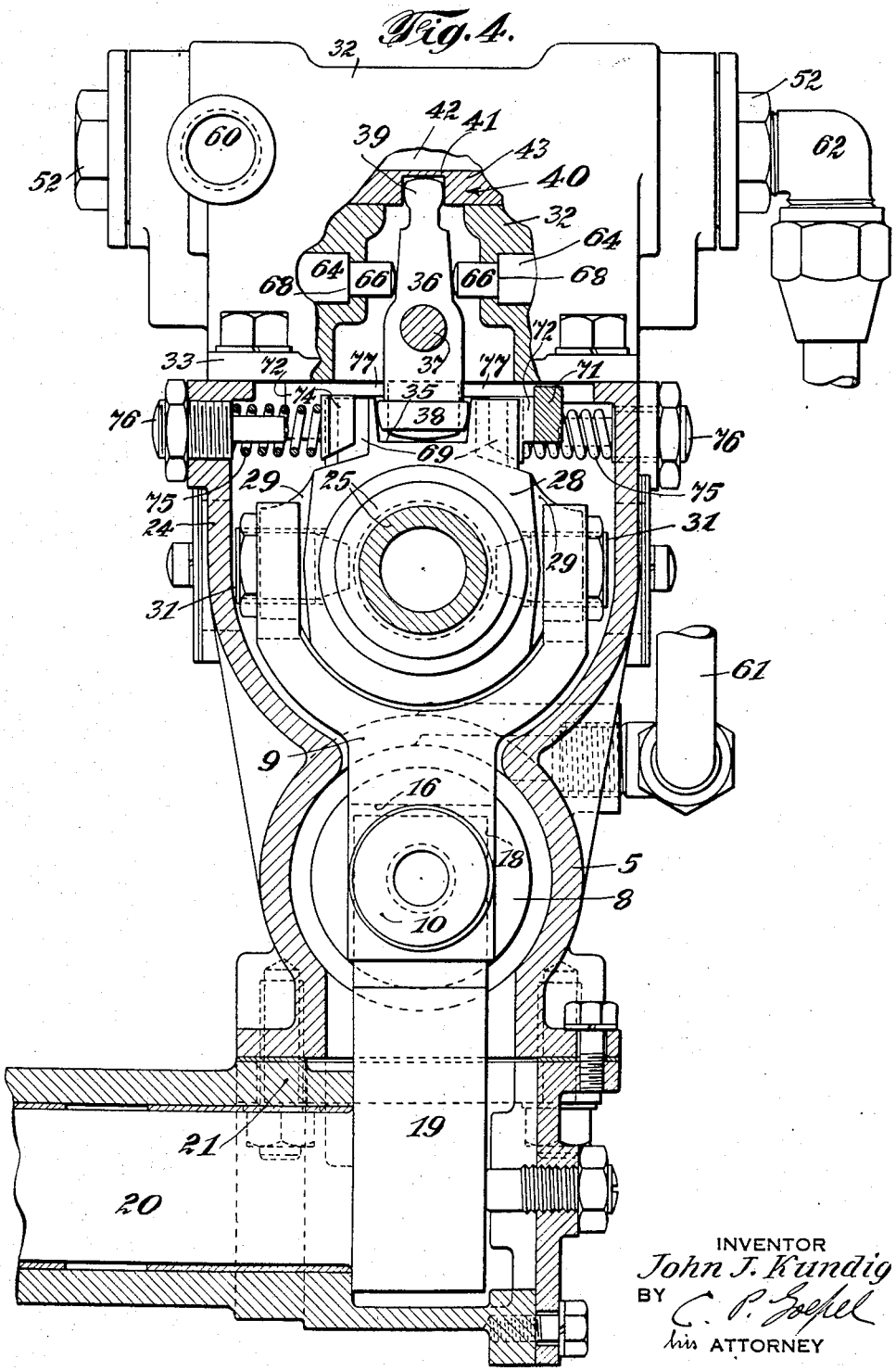
INVENTOR
John J. Kundig
BY
his ATTORNEY

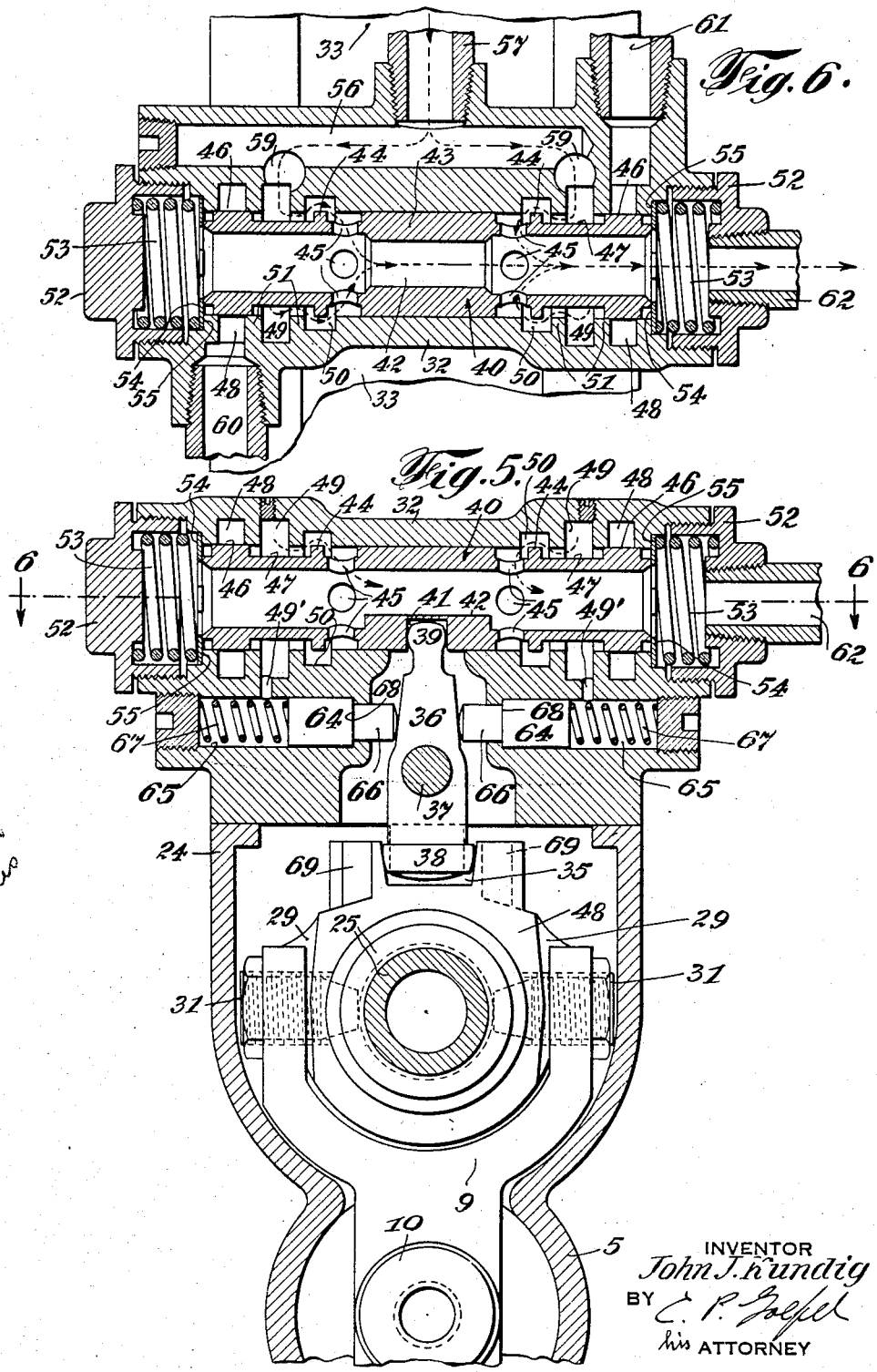

Dec. 15, 1936.  J. J. KUNDIG  2,063,937
FLUID PRESSURE ACTUATOR
Filed Jan. 10, 1931  8 Sheets-Sheet 5
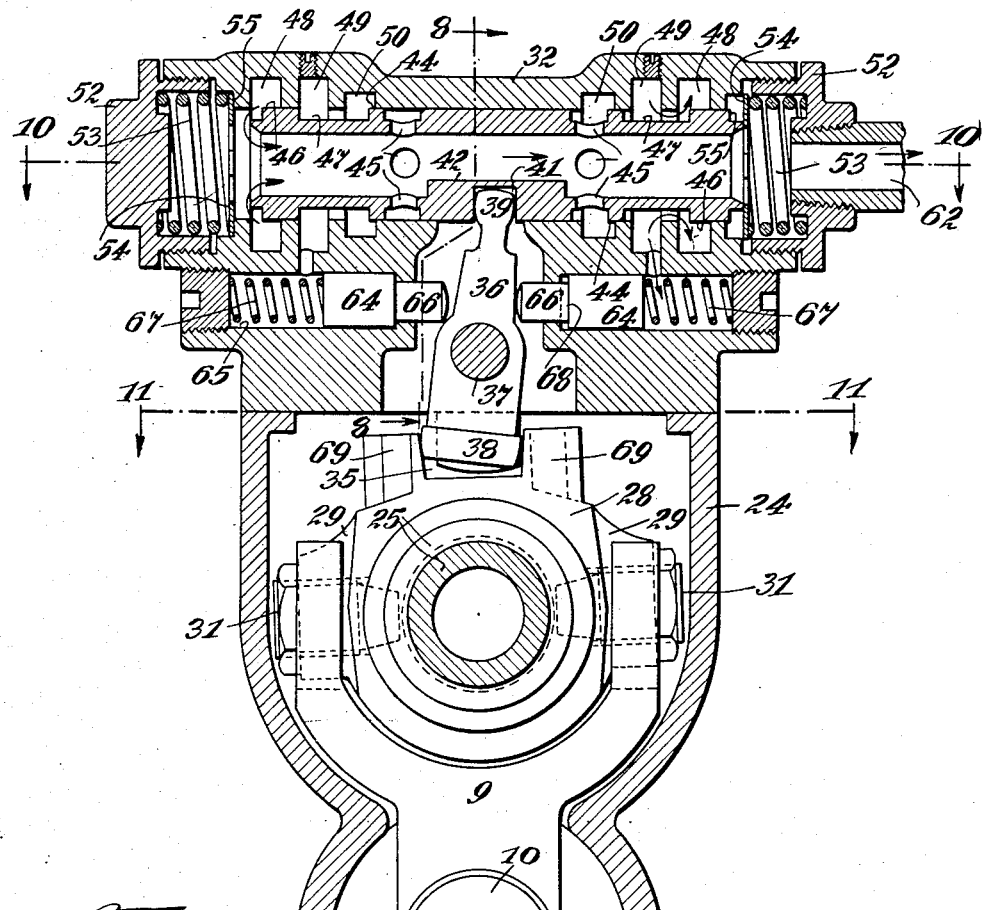
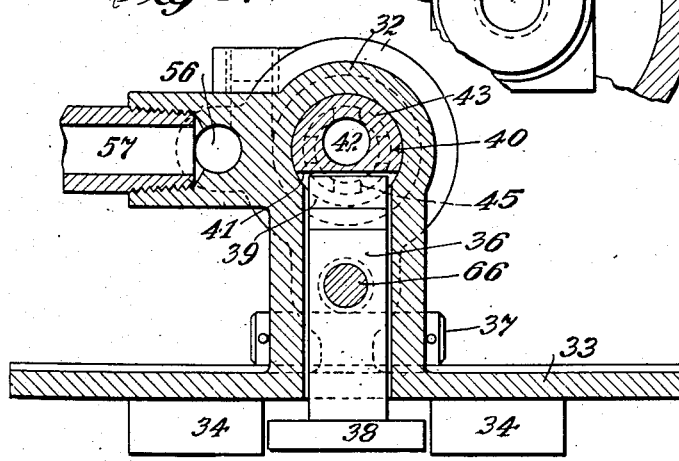
INVENTOR
John J. Kundig
BY
his ATTORNEY Dec. 15, 1936.  J. J. KUNDIG  2,063,937
FLUID PRESSURE ACTUATOR
Filed Jan. 10, 1931   8 Sheets-Sheet 6
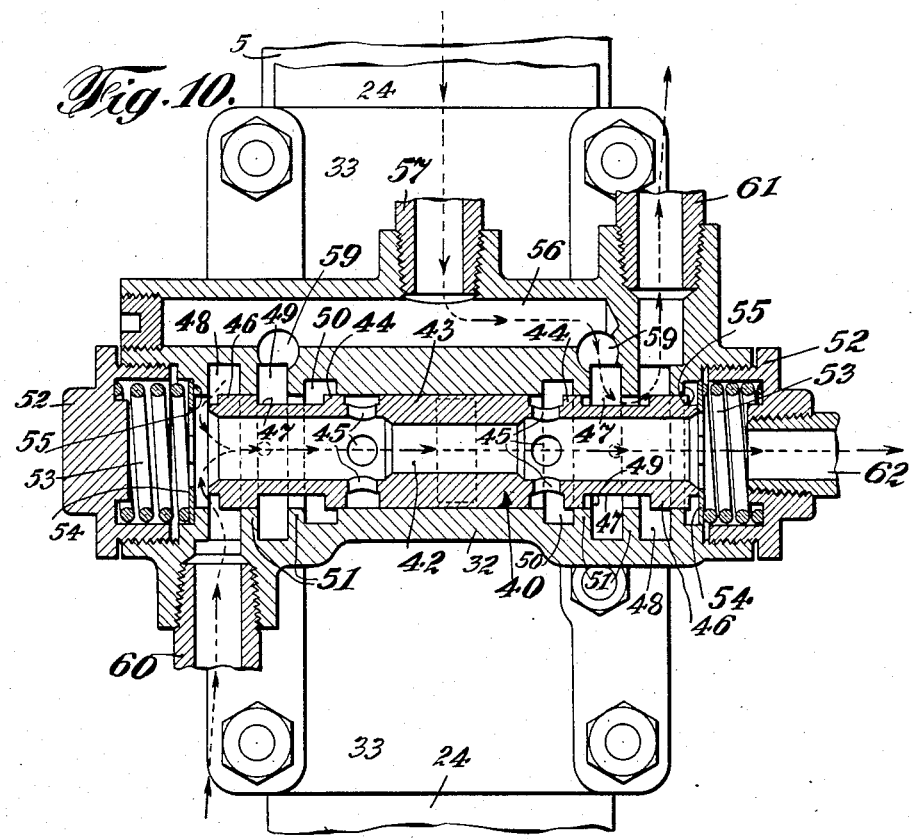
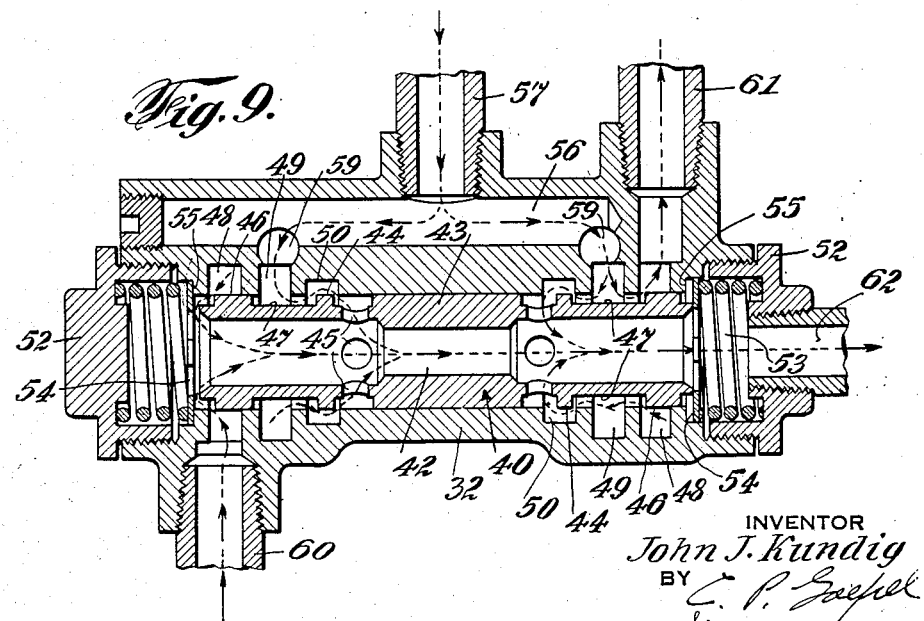
INVENTOR
John J. Kundig
BY
his ATTORNEY Dec. 15, 1936.  J. J. KUNDIG  2,063,937
FLUID PRESSURE ACTUATOR
Filed Jan. 10, 1931    8 Sheets-Sheet 7
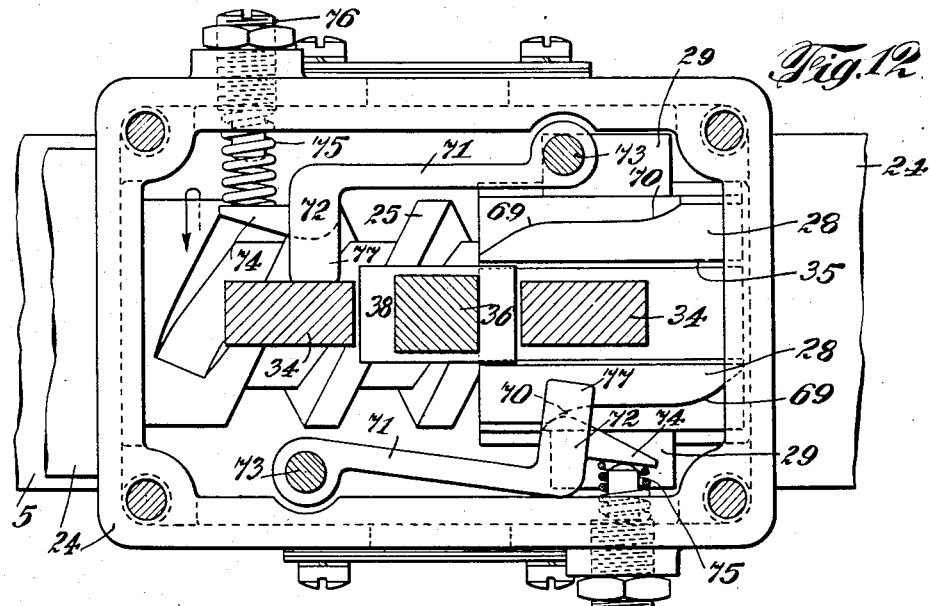
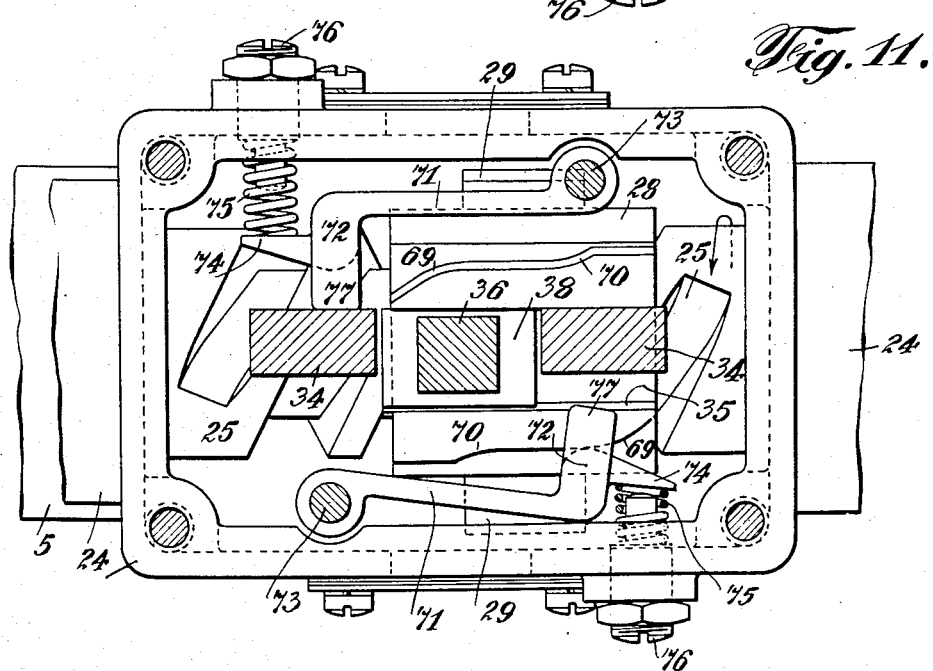
INVENTOR
John J. Kundig
BY
his ATTORNEY Dec. 15, 1936.  J. J. KUNDIG  2,063,937
FLUID PRESSURE ACTUATOR
Filed Jan. 10, 1931  8 Sheets—Sheet 8
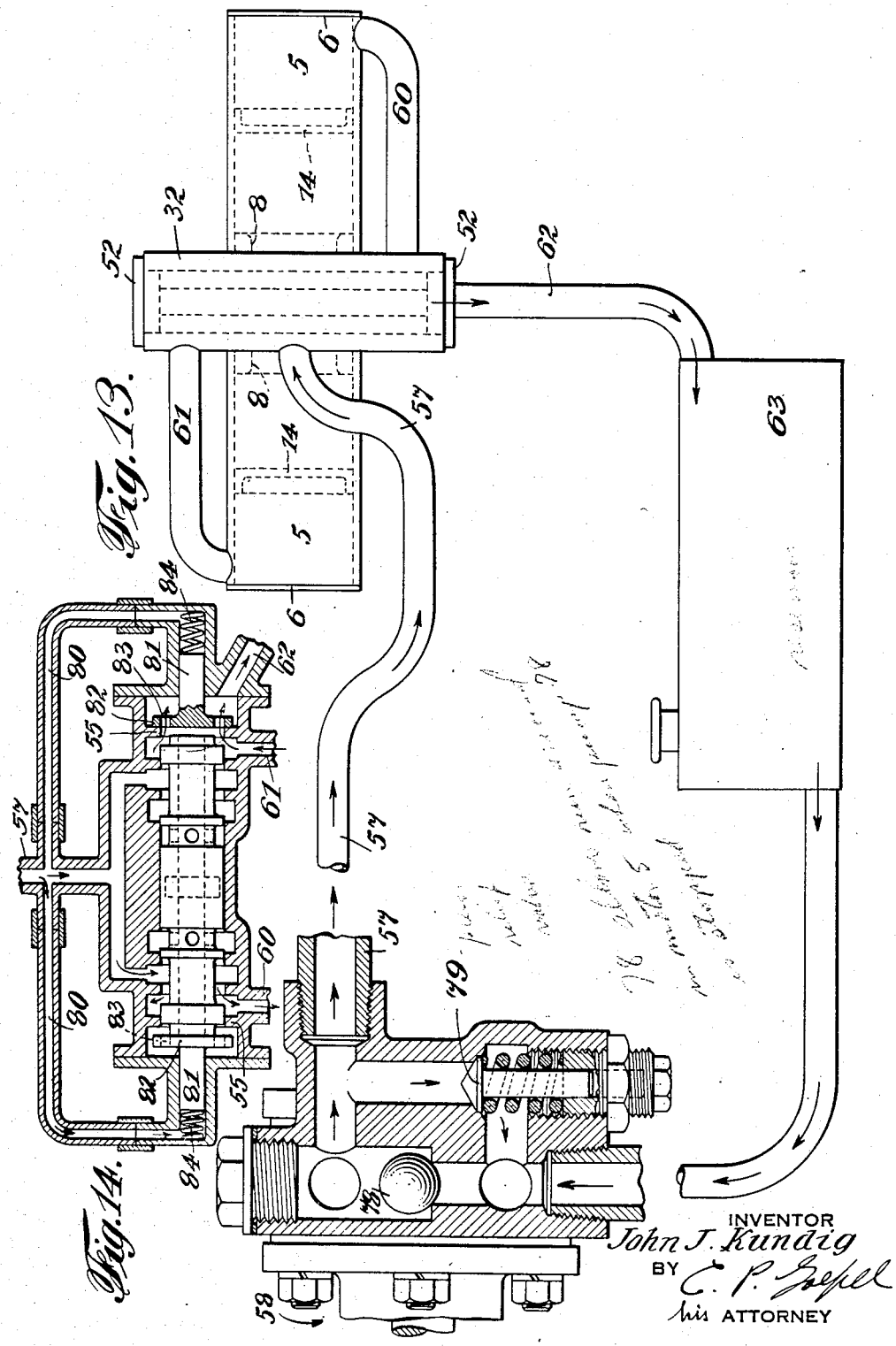
INVENTOR
John J. Kundig
BY
his ATTORNEY Patented Dec. 15, 1936

2,063,937

UNITED STATES PATENT OFFICE 2,063,937

FLUID PRESSURE ACTUATOR

John J. Kundig, New York, N. Y.

Application January 10, 1931, Serial No. 507,784

14 Claims. (Cl. 121—41)

This invention relates to fluid pressure operated actuators and has for its general object and purpose to provide certain improvements in such apparatus used to control or operate a mechanism by power in which the manually operable control means cause the power operated mechanism to operate in synchronism with it.

A primary object of my present improvements is to provide an automatically acting means which tends to counteract the physical exertion applied to operate the manual control means in direct proportion to the power output of the fluid pressure operated actuator, so that there will thus be transmitted to the manual control means, a resistance against the controlling movements which is exactly proportionate to the resistance offered to the flow of the fluid medium, which in turn varies in exact proportion to the resistance offered to the movement of the operated mechanism.

A further object of the present invention is in providing means, whereby the retroactive impression upon the manual control means is effected only during the mobile operation thereof.

Another improvement in the invention consists of the provision of means to close all conduits leading to and from the actuator during any and all stationary positions to thereby positively lock the operated mechanism by the actuator enclosed pressure fluid and whereby no retroactive effect is realized from such closed-in pressure fluid upon the manual control means, when the latter are not in operation.

Another improvement consists in the provision for absolutely neutralizing the retroactive influence derived directly from the fluid pressure supply and thereby preventing any action thereof upon the control means when the latter is in a nonoperating or neutral position.

Another improvement consists in the arrangement of the different elements, whereby the physical power exerted to preponderate the progressive proportionate reactive impression is transmitted to be used as an assistance to the power operation and whereby supplementary physical power can be automatically added to the actuator power, if the power supply should become insufficient and to shunt automatically to whole physical operation in case of power supply failure.

A further improvement consists in providing means for automatically effecting a reverse actuation of the actuator to return the operated mechanism to a predetermined starting position upon release of the manually operated control means, and whereby the proportionate reaction upon the control means is automatically counteracted to a predetermined extent to thereby limit the maximum power effect for such automatic return actuation.

Another object of the invention consists in the provision of means positively and automatically acting to cut off the fluid pressure supply which is wholly independent of the manual control means and cannot be counteracted in its operation so that the effective power operation of the mechanism is positively and automatically limited to a predetermined dimension of travel, thus obviating the possibility of placing the different parts of the mechanism unnecessarily under excessive strains.

It is also a further object of my new invention to provide an improved construction, mounting and arrangement of the fluid flow control valve automatically operating to closed position independently of the fluid pressure actuated means.

This invention is exemplified in the following specification and drawings in its application to a power operated steering gear for an automobile, although without any intention of restricting the invention to this particular application or use. As a further exemplification I use in the disclosure herein a hydraulic fluid as power medium which is maintained in continuous circulation in a closed circuit by a positive pump and under relatively low pressure, when the device is not being operated. This pressure, however, builds up instantaneously when the hydraulic fluid flow is being diverted from its normal circuit to actuate the mechanism and in proportion to the resistance encountered by the latter. Reference is here made to my issued Patent No. 1,534,791.

This invention further comprehends numerous improvements over the mechanism disclosed in my issued patent, whereby a very compact assembly is produced which will occupy relatively little space and which will be highly efficient and reliable in its operation to semi-automatically control the steering action of the vehicle wheels without reaction upon the hand wheel upon striking obstructions or depressions in the road surface when the device is not being actively operated, and without deviation of the steering wheels from their course in the event of a blow-out of either of the wheel tires.

With the above and other objects in view, the invention consists in the improved fluid pressure actuation, and the relative arrangements of the several parts of the exemplified construction as illustrated in the accompanying drawings, will be hereinafter more fully described and subsequently incorporated in the subjoined claims, the invention not being confined to the specific construction and design shown in the drawings as the several parts of the mechanism may be modified and the invention embodied in various modifications.

In the drawings, wherein I have illustrated one simple and practical embodiment of the essential features of my present improvements, and in which similar reference characters designate corresponding parts throughout the several views,—

Figure 1 is a side elevation illustrating the improved construction of my hydraulic steering gear as applied in one embodiment thereof in assembled position upon a motor vehicle;

Fig. 2 is a top plan view, the circuit control valve for the hydraulic medium being shown in section and with the movable valve element in neutral position, such section being taken substantially on the line 2—2 of Fig. 3;

Fig. 3 is a longitudinal sectional view taken on the line 3—3 of Fig. 2;

Fig. 4 is a transverse sectional view taken substantially on the line 4—4 of Fig. 3;

Fig. 5 is a vertical sectional view taken on the line 5—5 of Fig. 2;

Fig. 6 is a horizontal sectional view taken on the line 6—6 of Fig. 5;

Fig. 7 is a view similar to Fig. 5, of the circuit control valve in an operated position;

Fig. 8 is a detail vertical section taken on the line 8—8 of Fig. 7;

Fig. 9 is a horizontal sectional view illustrating a position of the valve at the start of its movement in one direction whereby the flow of the hydraulic medium is controlled to progressively build up the cylinder pressure;

Fig. 10 is a sectional view taken on the line 10—10 of Fig. 7;

Fig. 11 is a horizontal sectional view taken on the line 11—11 of Fig. 7 showing one position of the parts;

Fig. 12 is a similar view illustrating a relatively different position of the several parts;

Fig. 13 is a semi-diagrammatic view, a part of the apparatus being illustrated in section;

Fig. 14 is a detail sectional view showing a modified construction wherein means is provided for directly impressing a retroactive influence upon the axially shiftable valve.

As illustrated in the drawings, the apparatus includes integrally connected oppositely extending cylinders 5 having their inner opposed open ends spaced apart and closed at their outer ends by suitable heads 6. A piston 7 reciprocates in each of said cylinders. While these pistons may be of various constructions, I preferably produce the same in the form of hollow shells for the sake of lightness, each shell being closed at one end and provided thereon with an axially projecting hollow boss or extension 8. These hollow extensions of the opposed ends of the pistons 7 receive oppositely projecting trunnions 10 formed on the lower end of a yoke member 9. The bolts 11 rigidly connect the pistons with the respective trunnions 10, each of said bolts having a threaded bore to receive the threaded end of a rod 12 extending through the closure plate 13 for the open end of the pistons 7 and the cup leather 14, the flange of which is engaged with the wall of the cylinder 5. The nut 15 threaded upon the other end of the rod 12 securely retains the several parts in assembled relation.

The lower end of the yoke 9 between the trunnions 10 is recessed or bifurcated as indicated at 16 to receive the upper reduced end 18 of an arm 19 which is integrally formed with or fixed to one end of the transversely positioned shaft 20 which is journalled in a suitable bearing 21 bolted or otherwise rigidly fixed to the cylinder casting. One or more shims may be inserted between the upper side of the shaft bearing 21 and the cylinders 5 to obtain the desired running clearance and to compensate for wear of the end 18 of arm 19 and the walls of slot 16. The other end of this shaft is provided with the downwardly extending arm 22 for connection with the rear end of the reach rod 23 of the steering gear in the usual manner.

Upon the upper side of the cylinder casting, a suitable housing 24 is formed for the double threaded screw or worm 25 which may be integrally formed with or rigidly secured to the lower end of the obliquely positioned steering post 26 upon the upper end of which the usual hand wheel 27 is secured.

A collar 28 loosely surrounds the worm 25 and is provided at its opposite sides with rectangular projections 29 positioned in the slots 30 formed in the upwardly projecting arms of the yoke 9. Adjustable screws or pins 31 extend through each of the parts 29 of the collar and have their inner ends engaged with the thread of the worm 25 so that the collar 28 thereby functions in the manner of a nut.

The upper open side of the housing 24 is closed by the base 33 of the control valve casing 32. This base is provided with two spaced stops or abutments 34 on its under side arranged in alignment with each other and in the vertical plane of the axis of the worm 25. The collar 28 has an upwardly projecting portion centrally provided with a longitudinally extending slot 35 which receives the stops or abutments 34.

A valve actuating lever 36 is fulcrumed intermediate of its ends upon the pin 37 mounted in the base 33 and projects upwardly through a central opening provided in the lower side of the valve casing 32. The lower end of this lever is formed with an enlarged head 38 which is positioned in the slot 35 of the collar 28 and extends across substantially the full width of said slot.

The lever 36 at its upper end is formed with the reduced part 39 which is engaged in the slot or recess 41 centrally formed in the lower side of the axially shiftable control valve 40 which is mounted in the casing 32. In the preferred form of this valve, it is preferably hollow or provided with an axially extending bore as indicated at 42 opening through the opposite ends of the valve. At opposite sides of its central portion 43 which has frictional engagement with the wall of the valve casing, the movable valve member is externally formed with the annular ribs 44. Between the central portion 43 and these ribs, a plurality of openings 45 in the valve member afford communication between the bore 42 thereof and the interior of the casing 32. In axially spaced relation from each of the ribs 44 and adjacent to each end of the valve member, a second relatively wide annular rib 46 is formed upon said valve member. The ribs 44 and 46 are of the same diameter as the central part 43 of the valve member for frictional sliding engagement with the wall of the valve casing. These spaced ribs 44 and 46 thus provide upon the outer side of the valve member and at each end thereof a relatively wide annular channel or groove 47.

The wall of the valve chamber 32 at each end thereof, is internally formed with three axially spaced annular chambers 48, 49 and 50 respectively, said chambers being separated from each other by the webs 51.

The opposite ends of the bore of the valve casing are closed by the threaded caps or plugs 52 which provides seats for the outer ends of coil springs 53, the inner ends of which are engaged against the annular washer plates 54 which seat against shoulders 55 on the valve casing and have parts bearing against the opposite ends of the valve member 40.

One side of the valve casing 32 is formed with a longitudinally extending bore or passage 56 with which the conduit or pipe 57 receiving a hydraulic medium under pressure from a suitable supply source is connected. In the illustrated application of the invention, oil as the hydraulic medium, may be supplied from the crank case of the motor or a special tank or reservoir by means of the pump indicated at 58 which may be suitably geared to the cam or generator shaft of the machine, or other motor driven part.

The oil supply passage 56 is in communication as indicated at 59 with each of the annular chambers 49 of the valve casing 32. The chamber 48 at one end of the valve casing, is connected by means of the pipe or conduit 60 with the outer end of the left hand cylinder 5 while the corresponding chamber 48 at the opposite end of the valve casing is connected by pipe or conduit 61 with the outer end of the right hand cylinder 5.

With the closure plug or cap 52 at one end of the valve casing 32, the return pipe 62 to the supply tank 63 is connected. Thus, it will be apparent that normally, or when the valve is in its neutral position, as shown in Figs. 2 and 5, the fluid has free and continuous circulation from the supply passage 56 through the communicating chambers 49 and 50, and from chambers 50 through openings 45 and the bore of the sleeve 40 to return pipe 62 and hence back to the supply tank 63 from which it is returned to supply passage 56 by the pump 58.

In the neutral or closed position of the valve 40, the chambers 48 at opposite ends of the valve casing 32 are effectively sealed by the end ribs 46 on the valve member 40 so that no oil may flow through these chambers and to the cylinders 5. It is evident that by the effective sealing of chambers 48, the pressure fluid enclosed in the cylinders 5 will lock the pistons 7 in their assumed positions and check reactionary forces resulting from front wheel disturbances.

In the base of the valve casing 32 I provide two spring pressed pins or plungers 64 slidingly fitted in the relatively opposite cylindrical chambers 65 which communicate by the ports 49' with the chambers 49. These pins have relatively large body portions with the cylindrically reduced portions 66 at one end thereof engaging opposite sides of the valve actuating lever 36 above its pivot 37. Movement of the pins under the action of the coil springs 67 into engagement with the valve lever is limited by the inner end walls of the chambers 65 with which the shoulders 68 of the pins are normally in engagement when the valve member 40 is in a neutral position. The springs 67 also serve to prevent the outward shifting movement of the pins 64 to position, which would obstruct the ports 49'. The springs 53 pressing upon the washer plates 54 on the opposite ends of the valve member 40 hold the latter in the neutral position and compensate for wear or lost-motion between the valve lever 36 and the walls of the slots 35 and 41.

The opposite sides of the upwardly projecting part of the collar 28 having the groove 35 therein are formed with longitudinally spaced cam surfaces indicated at 69 and 70, respectively, the corresponding cam surfaces at opposite sides of the groove 35 being diagonally related for engagement by the ends of the angular parts 72 formed on the free ends of levers 71 which extend in relatively opposite directions on the fixed pivots 73. The end 72 of each lever has a finger 74 engaged by the inner end of a coil spring 75, the tension of which may be regulated by the adjustable screws 76. Each lever is further provided with a part 77 projecting at right angles to the finger 74 and over the slotted part of the collar 28 for engagement against the side face of one of the abutments or stops 34. The levers are urged to this normal position by means of springs 75, in which position, the levers are also engaged with the outer ends of the cam faces 69 so that the collar 28 together with the worm 25, and valve 40 are yieldingly held in the neutral and central position corresponding to the straight ahead movement of the vehicle.

From reference to Fig. 3 of the drawings, it will be noted that there is a slight clearance between the projections 29 on collar 28 and the walls of the slots 30 in the arms of the yoke 9. The extent of this clearance need not necessarily be as great as indicated in the drawings where for the sake of clarity, such clearance is somewhat exaggerated.

Assuming that the circulatory system for the oil or other hydraulic medium has been filled with fluid, and the steering wheel 27 is first operated to turn the worm 25, for example, in a counterclockwise direction, from reference to Figs. 11 and 12, the collar 28 being held from rotating by the valve control lever 36, will first be moved by the worm thread to the right until the right side of this collar contacts with the inner side of the right hand arm of yoke 9 which forms the right-hand limit of slot 30 (Fig. 3). This movement is perceptible on the hand wheel 27 as a slight lost-motion.

When the clearance between the collar 28 and the yoke arm is taken up further longitudinal movement of the collar is prevented by the arms of the yoke 9, which in turn is prevented from moving axially by the non-compressible bodies of oil contained in the cylinders 5.

The operative connections between the worm 25 and the valve 40 on one side, and between the worm 25 and the jaws of yoke 9 on the other side, form a differential mechanism, since the movements of the worm 25 are transmitted to the part offering the least resistance.

The collar 28 will, therefore, rotate as a unit with the worm 25 and oscillate in a counterclockwise direction with the resulting oscillation of lever 36 and shifting of the valve 40 towards a position as shown in Fig. 7. Such oscillating movement of collar 28, however, is limited by the engagement of said collar at one side of the slot 35 with the abutment 34, as seen in Fig. 11.

In the initial axial movement of the valve member 40 to the right from the position seen in Figs. 5 and 6, as above explained, the ribs 44 and 46 will be positioned relative to the walls of chamber 50 and 48 so that a part of the oil entering chamber 49 from supply passage 56 at the right hand end of the valve will pass through chamber 50 and opening 45 and through the valve member to the return pipe 62, while another part thereof will pass from chamber 49 directly into end chamber 48 and hence through the connection 61 to the left hand cylinder 5. At the same time the rib 46 on the left hand end of the valve chamber is so positioned relative to the corresponding chamber 48 as to partially open up communication between the pipe 60 connected with the right hand cylinder 5 and the interior passage 42 of the valve 40, thus permitting oil from said cylinder to pass through said valve to the return pipe 62 and thus relieving pressure therein. This position of the valve is shown in Fig. 9.

In the continuation of the manual operation of the wheel 27 and the worm 25, the valve member 40 will be further shifted and pressure is thus progressively built up in the left hand cylinder and diminished in the right hand cylinder, until in the position of the valve shown in Figs. 7 and 10, communication between the right hand valve chamber 49 and the return pipe 62 is entirely cut off so that all of the pressure fluid from the supply passage 56 will enter the left hand cylinder.

Progressively with the increase of the cylinder pressure and the resulting movement of the pistons, the yoke member 9 and collar 28 are moved axially towards one end of the worm 25, thus relieving the operator of the necessity of maintaining a positive manual turning stress on the wheel 27 after the flow of the hydraulic fluid medium is directed from its normal course to one of the cylinders.

As long as worm 25 is kept in rotation, the piston and the yoke 9 will follow the axial movement of the collar 28 and the valve will be retained in an operating position. It is evident that the fluid pressure furnished by the positive pump 58 is always in direct proportion to the resistance which the vehicle wheels have to overcome by contact with the road surface during the operation of the steering mechanism. While the valve 40 is in an operating position which is maintained only by manual rotation of the worm 25, the plungers 64 are also subject to the fluid pressure influence, as chambers 67 are in constant communication with the fluid supply ports 49. In the operating position of the valve, as shown in Fig. 7, the lever 36 being in an inclined position, pushes the right hand plunger 64 to the right, causing the same to act against the fluid pressure in the chamber 65. The fluid pressure acting against the left-hand plunger 64 is neutralized as the latter is prevented from moving to the right by the shoulder formed at the end of chamber 65. It is also evident that the fluid pressure acting through plunger 64 upon lever 36 must constantly be overcome manually during the operation of the gear and since this fluid pressure in chamber 65 is equal to the pressure in the cylinder 5, such reaction is in direct proportion to the power output of the hydraulic steering gear and provides a proportionate resistance, or feel in the operation of the hand wheel 27.

When rotation of the hand wheel 27 and consequently of the worm 25 is stopped the piston and the yoke is still being shifted to the right by the fluid pressure for a diminutive distance which is equivalent relative to the lost-motion perceived through the hand wheel at the start of the steering operation. The manual contact pressure from the worm 25 and between the right side of collar 28 and the inner side of the right hand yoke arm 9, and acting as a fulcrum for the valve actuation, will be relieved. The fluid pressure acting upon plunger 64 and pushing the lever 36 towards a perpendicular position, with the cooperation of the valve centering spring 53 and the cam lever spring 75 (Fig. 11) shifts the valve 40 to the neutral position, shutting off further supply of pressure fluid to the cylinder 5. A corresponding movement is also transmitted to the collar 28 which is being rotated in the clockwise direction and back to neutral position as indicated in Fig. 5. During this movement a frictional contact between the right side of the collar 28 and the yoke arm 9 will be maintained due to the pressure influence of spring 75 which tends to rotate the collar 28 clockwise in a path following the thread of the worm 25. Since the yoke 9 will be stationary concurrently with the valve 40 reaching its neutral position and the screw pins 31 engaging the thread of the worm 25 will act as a wedge, a further rotation of the collar 28 beyond its neutral position will be prevented, as long as the worm 25 respectively the hand wheel 27 is being held stationary. The piston 7 and consequently the steering mechanism will then be locked in their assumed position and the vehicle will travel in a path as directed by the steering wheels. It will be clearly understood from this description that the shutting off of the pressure fluid supply to the cylinder 5 is effected by the reactionary pressure effect of the fluid upon the control means and entirely independent of any following up movement of the hydraulically actuated mechanism.

The contact between the arms of the yoke 9 and the portions 29 of collar 28 serves merely as a fulcrum or bearing to open the valve member 40. Immediately upon relieving contact pressure resulting from the mobile manual operation of worm 25 and upon this fulcrum, the valve returns to its neutral or closed position.

Since the shifting of the valve 40 to its closed position is effected by the fluid pressure influence and independent of the movement of both manual operated means and the power-operated piston, it is apparent that in the exemplary form of the invention as illustrated in the drawings, an irreversible or self-locking worm drive could be used as manual operating means for the valve, if the means for automatically returning the steering gear to straight ahead position, as described in later paragraphs, is obviated. An irreversible worm drive would present the advantage of a greater range of steering gear ratio selection, without resorting to an abnormally long worm if a high gear-ratio is desired.

When the supply of pressure fluid from the pump to the piston cylinders is in such excess that it would tend to cause the piston to overrun or move at a greater speed in an axial direction than permitted by the manual rotation of the worm, the fork 9 would tend to move faster than collar 28, so that abutting contact between the fork-arm and the collar would be relieved. This permits the reactionary back pressure from plunger 64 to actuate the control means and to partly obstruct the cylinder pressure fluid supply port 48, thereby re-establishing a balanced condition and perfect synchronism.

It will be understood that the movements of the hand wheel 27 by the operator, determines only the direction in which the vehicle is to be steered, while the actual steering movement of the vehicle wheels is accomplished automatically by the hydraulically actuated steering mechanism above described. Thus, the only physical effort which is required in the operation of the device is that which may be necessary to overcome frictional resistance to the movement of the valve 40, the proportionate reaction pressure of plungers 64 and to compress the springs 53 and 75. However, if greater turning strength is applied upon the wheel 27 than called for to overcome such resistance, the actuation of the hydraulically operated steering mechanism will be physically accelerated.

Referring now to Figure 13 of the drawings, it will be seen that if the engine should stall or the pump get out of order, or for any other reason the supply of pressure fluid to the valve member 40 should fail, the vehicle may be manually steered in the usual manner. The vacuum created in the supply line 57 by the manual operation of the pistons 7 would then open the suction valve indicated at 78 to admit fluid to the cylinders. A relief or safety valve shown at 79 is also provided for the purpose of relieving excessive shock pressures from the cylinders 7 to protect the pump and steering mechanism. It will be understood that those valves 78 and 79 may be of any suitable type other than those shown in the drawings.

Referring to Figure 12, the supply of pressure fluid to either cylinder will be cut off automatically when the steering wheels of the vehicle are at the limit of their angular turning movement. This operation may be properly regulated by adjustment of the pins or screws 76, which positions the end of lever 71 to cooperate with the cam face 70 of the collar 28 as it reaches a position near the end of its axial movement on the worm 25 and operates to rotate said collar to thus actuate lever 36 and shift the valve member 40 to its neutral position to again establish free continuous circulation between the supply tank and valve casing.

In a further axial movement of the collar 28 towards the right from the position shown in Figure 11, the high cam portion 70 will finally reach the cam portion 72 of the lever 71. The latter being prevented from swinging further outwardly due to the stop-pin 76 contacting the portion 74, will therefore force the collar 28 to rotate in an opposite direction thereby shifting the control valve 40 back to neutral position.

Concurrently with the aforesaid action of cam 72 effecting the closure of valve 40, a further manual rotation of the worm 25 in the same direction will be counteracted and rendered impossible due to the closed-in pressure fluid in the cylinders 5 locking the pistons 7 together with yoke 9 in their assumed position. The steering gear respectively the steering wheel 27, cannot thereby be operated beyond a predetermined angular position in either direction either by fluid pressure or by manual power. The inner end of screw 76 constitutes a positive stop engaged by the part 74 of the lever 71 and by adjusting this screw, it is evident that the time at which the lever 71 will effectively coact with the cam surface 70 in the axial movement of the collar 28 to rotate said collar can be regulated as desired.

In the operation of the gear such as shown in Fig. 7, the collar 28 is shifted axially by the worm thread and away from its central position and in a position inclined in a direction of the rotation of the worm 25, whereby the valve 40 is being operated to fluid diverting position to cause actuation of the piston and thereby of the steering mechanism in one direction. The steering wheels are thereby diverted from their straight-ahead position and the vehicle will travel in a progressively increasing curve. If the hand wheel 27 and thereby the worm 25 are then held stationary, the fluid pressure reaction from the right hand plunger 64 upon the lever 36 will shift the valve 40 back to neutral position and stop the actuation of the piston. The vehicle will then travel in a fixed curved path which is determined by the assumed position of the steering front wheels of the vehicle. By the action of the plunger 64 upon the lever 36, the collar 28 will also be returned to its perpendicular or neutral position.

Since the collar 28 in this last named actuation of the gear, was shifted axially upon the worm 25 and away from its central position, one of its cam faces 69 has been shifted upon the cam 72 of the cam lever 71 and thereby compresses the cam lever spring 75. The pressure of spring 75, which acts in a tangential direction upon the collar 28, must be counteracted by the operator holding the hand wheel 27 and thereby the worm 25 in the assumed stationary position.

When the hand wheel is being released by the operator, the pressure of spring 75, acting through lever 71 and cams 72 and 69 upon collar 28, will rotate the latter in unison with the worm 25 by the engagement of pins 31 beyond its neutral or perpendicular position, since the worm cannot shift axially and thereby shift the control valve 40 in a reversed direction to the aforesaid manual operation, whereby the piston and the steering mechanism will also be actuated in a reversed direction to operate the front wheels back towards the straightened travel position. In this reversed actuation the opposite plunger 64, under the reactionary influence of the reversely actuating pressure fluid acting upon the lever 36, tends to counteract the pressure influence of spring 75. The pressure capacity of spring 75 must therefore be big enough to overcome a predetermined reaction pressure from the opposite plunger 64 and to thereby effect an automatic reverse actuation by a predetermined minimum fluid pressure potentiality. It is, therefore, apparent that the maximum fluid pressure effective for the automatic return movement may be predetermined by the pressure resistance of springs 75.

Since the power required to operate the steering mechanism back to straightened position is generally small due to the self-straightening tendency of the front wheels and effected by appropriate geometric in the front axle design, a relatively weak spring 75 is sufficient to effect a reverse actuation.

When the collar 28, in its axial travel upon the reversible worm 25 during the return actuation, has reached a position immediately near the center or straight-ahead position, the rounded portion of cam 69 will ride off the cam 70 of the spring pressed lever 71 which, in its swing towards the center, will come in contact with the abutment 34, thereby neutralizing the pressure of spring 75 upon collar 28. The valve 40, by the reactionary influence of the plunger 64 upon lever 36 and by the pressure influence of the valve centering spring 53, will then finally be shifted to neutral position, thereby shutting off communication with the cylinder 5 and locking the steering mechanism in the straight-ahead position. Since the collar 28 is turned back to a perpendicular position in its final shifting movement to the center position concurrently with the closure of the control valve 40, the oppositely located cams 89 will then assume a position between and contacting with the opposite spring pressed cams 70 and thereby hold the collar 28 together with the valve 40 in the neutral position.

In Fig. 14 of the drawings, I have illustrated a means for impressing a reactionary influence by the hydraulic medium directly upon the shiftable control valve, as an alternative for the pins or plungers 64 above referred to which coact with the valve shifting lever 36. In this construction, I provide the by-passes 80 extending laterally in opposite directions from the central supply inlet 57 for the hydraulic medium, and coupled at their outer ends with tubular extensions on the end heads of the valve casing or housing. In each of these tubular parts of the casing heads, the plungers 81 are arranged and are provided on their inner ends with flanges 82 having openings 83 therethrough for the passage of the hydraulic fluid. Normally or when the valve is in neutral position, the flanges 82 are yieldingly held in contact against the internal ribs 55 of the valve casing by means of the springs 84. In this case, cylinder connections 60 and 61 with the valve casing are on the same side of the axis thereof, while the return connection 62 to the supply tank is made through one of the casing heads at one side of plunger 81.

In the neutral position of the valve member, the hydraulic medium has a free and unobstructed flow in the same manner as shown in Fig. 6, through the hollow valve member to the return pipe connection 62. As soon, however, as such return connection has been cut off and communication established between the supply connection and one of the cylinder connections 60 or 61, fluid pressure also enters the by-pass connections 80 and acts against said plungers 81. Thus, in further shifting of the valve and as pressure is built up in the cylinder, the fluid pressure acting against one of the plungers 81 must be overcome. In this manner, it will be evident that a retroactive influence is directed against the moving valve member which is directly proportionate to the variation of pressure in the cylinder, and therefore to the frictional resistance which may be encountered in the angular turning movement of the steering wheels. This retroactive influence is transmitted through the valve operating lever 36 to the manually operated steering wheel in the manner above explained.

It will be understood that the physical exertion applied to rotate the worm 25 and thereby counteract the retroactive force from the actuating fluid pressure upon the control means, is automatically transmitted to the actuator to augment the power output of the latter, since the contact between lever 36 and plunger 64, as illustrated in Fig. 7, or in the alternative embodiment as shown in Fig. 14, between valve and plunger 81, acts as a fulcrum for said applied physical power which is being transmitted by the differential action of collar 29 to the moving yoke 9 and thereby to piston 7.

The springs 84 operate in the same manner as the springs 53 referred to in connection with the first described embodiment of the invention, to normally retain the shiftable valve member in an exactly neutral position, and prevent casual shifting movement of said valve member which might otherwise occur due to wear between relatively movable parts of the mechanism to a sufficient extent to open communication between the hydraulic fluid supply connection and one of the piston cylinders. Also, as the manual exertion applied to the hand steering wheel necessary to operate the valve, is very slight, the provision of springs reduces sensitiveness in the action of the valve and prevents movement thereof due to vibration transmitted through the body of the vehicle to the steering wheel, thus the operator is enabled to easily control the action of the valve and keep the travel of the car in a "straight-ahead" direction.

While the retroactive effect upon the valve or the actuating means thereof actually sets in only after the valve has first been shifted a sufficient distance to unseal communication between the supply and one of the cylinders in which the pressure is gradually built up, the springs 53 respectively 84 react immediately upon the valve upon movement from its neutral position so that a smoother progression in the "feel" of the increase in resistance to the valve movement is transmitted to the hand wheel 27.

While I have described and illustrated one preferred form of my present invention, it is not my intention to limit its scope to that particular embodiment. The invention as disclosed is exemplified in its adaptability to a power-operated steering mechanism of an automobile; and I have shown as further exemplification, how a hydraulic fluid medium may be used as a power transmitter. However, it is obviously clear to those skilled in the art that any other fluid medium under pressure may be used to advantage for operating a power actuator embodying the hereindescribed improvements.

The widespread use of the class of apparatus known as servo-motor for actuating various mechanisms by power and to which class the present device is closely related, also reveals the possibility of its adaptability and usefulness in connection with the actuation of other mechanisms, without departing from the principle of function as herein described and whereby analogous results may be secured.

It is also obvious that in the further commercial development of my present improvements, the essential features of the device might also be incorporated in various other alternative structural forms, and I therefore reserve the privilege of resorting to all such legitimate changes as may be fairly embodied within the spirit and scope of the invention as claimed.

I claim:

1. In a power-operated mechanism including a fluid pressure actuator operatively connected therewith, a supply of pressure fluid, fluid pressure control means, means for maintaining said fluid normally in continuous circulation through said valve means, communications between said valve means and said actuator normally closed by said valve means, manual control means to operate said valve means whereby to open said communications and to divert said fluid from its normal course upon said actuator whereby to actuate said mechanism in one direction, means influenced by the supply fluid pressure and acting oppositely to the movements of and upon said valve means for effecting a retroactive force upon said manual control means directly proportional to the fluid pressure required for the actuation of said mechanism, said fluid pressure influenced means restoring said valve means to non-diverting position whereby to close said communications concurrently with the stopping of the manual operation of said control means, and means limiting the action of said fluid pressure influenced means whereby to stop the reactionary effect from said pressure fluid supply upon said valve means during the non-diverting position of the latter.

2. In a power-operated mechanism of an automotive vehicle, the combination of a fluid pressure actuator operatively connected to said mechanism and comprising a pair of fluid pressure cylinders, a reciprocating piston therein, a source of fluid pressure obtained from the motive power of said vehicle, a fluid pressure control valve having communication with said cylinders normally closed by said valve to thereby effectively lock said mechanism and prevent reactions upon said actuator by the enclosed fluid pressure in said cylinders, manual control means for said valve, operative connections therebetween and said actuator for manually operating said valve into open position by the differential of movements between said actuator and said manual control means to selectively admit an amount of pressure fluid to either side of said piston and through said communication and to release an amount of pressure fluid equal to said admitted amount from the opposite side of the piston to thereby actuate said mechanism, and means directly influenced by the fluid pressure to apply a retroactive influence opposing said manual operation of said valve in direct proportion to the amount of power delivered by said source for said actuation, said fluid pressure influence means acting to automatically close said valve and thereby lock said mechanism concurrently with the stopping of the manual operation of said control means.

3. In combination a fluid pressure actuator connected with a part to be actuated, fluid pressure control valve means, a supply of pressure fluid, means for maintaining said fluid in continuous circulation through said valve means, communications between said valve means and said actuator normally closed by said valve means, control means for said valve means, manual operating means for said control means to operate said valve means from neutral position in one direction to open said communications and to divert said fluid from its normal course upon said actuator to thereby cause an actuation of said part in one direction, means influenced by the supply fluid pressure and acting oppositely to the movements of and directly upon said control means whereby effecting a retroactive force thereupon which is proportional to the fluid pressure required for said actuation of said part, said fluid pressure influenced means acting to operate said control means to thereby restore said valve to neutral position whereby closing said communications concurrently with the stopping of the manual operation of said operating means. and means acting to limit the effect of the reactionary force from said fluid pressure influenced means upon said control means when the manual operation is being stopped.

4. In combination, a fluid pressure actuator comprising spaced cylinders and an oppositely acting piston therein, a part operatively connected to said actuator, a pressure fluid supply, double acting valve means normally held in a neutral or non-diverting position by resilient means and having conduits leading to said cylinders, said conduits being closed during the neutral position of and by said valve to lock the piston effectively in its position by the enclosed pressure fluid in the cylinders to thereby hold said connected part irreversibly in a stationary position, manually operable control means for operating said valve means to open said conduit for selectively subjecting the sides of the actuator piston to the fluid pressure of said supply and simultaneously discharging pressure fluid from the opposite cylinder and a movable element having one side subjected to the pressure influence of said supply and acting oppositely to the movement of and upon said valve means to apply a retroactive force upon the manual control means which is proportional to the resistance opposed by said part to the actuator, said movable element restoring said valve means to neutral position in cooperation with said resilient means to close said conduits whereby to lock said piston concurrently with the stopping of the manual operation of said control means, and means to stop said movable element to thereby stop said retroactive force when said valve means have reached a neutral position.

5. A follow-up mechanism comprising a fluid pressure actuator operatively connected with a part to be actuated and normally held irreversibly by said actuator in a predetermined position, a supply of pressure fluid, a double acting fluid pressure control valve, manual operating means having operative connections with said actuator and said valve whereby to operate said valve to cause an operation of said part away from said predetermined position and in synchronism with the manual operation, means directly influenced by the actuator actuating fluid pressure whereby to counteract the manual operation of said valve in direct proportion to the power required for actuating said part in said direction and to return said valve to non-operating position simultaneously with the stopping of the manual operation of said operating means, a cam element subjected to movements relative to the movements of the actuator and having a neutral position corresponding to said predetermined position of said part, adjustable stop means acting upon said cam element to automatically shut off the fluid pressure supply to said actuator when the latter reaches a predetermined position near the limit of its power stroke and spring pressed means, adjusting means for the spring pressure, said spring pressed means acting under the influence of said cam to automatically operate said valve whereby to cause a reversed fluid pressure actuation of said part and towards said predetermined position when said manual operating means are being released by the operator to automatically follow up the movement of the actuator by the pressure action of said springs.

6. In combination a fluid pressure actuator operatively connected with a part to be actuated, a normally neutral positioned fluid pressure control valve, control means for said valve, manual operating means for said control means to operate said valve whereby to cause actuation of said actuator, said valve control means having fulcrum upon a part movable in cooperation with said actuator to effect synchronized operation of the latter during a continued manual operation of said operating means, means under the influence of the actuator actuating fluid pressure for effecting a retroactive force upon said manual operating means directly proportional to the power required to actuate said part, said fluid pressure influenced means acting to restore said valve to neutral position concurrently with the stopping of the manual operation, a cam element coacting with said valve control means, and adjustable stop means acting upon said cam element and in cooperation with said fluid pressure influenced means to automatically shut off the fluid pressure actuating said actuator when the latter reaches a predetermined position near the limit of its power stroke.

7. In combination with a fluid pressure power follow-up actuator, a fluid pressure cylinder and reciprocating piston therein, conduits from said cylinder to a fluid pressure control valve normally closing said conduits, a supply of pressure fluid to said valve, a mechanism operatively connected for actuation by said actuator and normally blocked irreversibly by the enclosed pressure fluid in said cylinder, manual control means for said valve to open said conduits and to admit pressure fluid to said cylinder for actuating said mechanism, movable means directly responsive to the variations of the actuating fluid pressure in said cylinder, whereby to automatically effect a retroactive influence upon said control means only during the mobile manual control of said valve and which is directly proportional to the actuator power, said fluid pressure responsive means actuating said valve to close said conduits concurrently with the stopping of said manual control and means acting upon said movable means whereby to stop the retroactive effect upon said control means during the non-operating position of said control valve.

8. In a fluid pressure actuator having a movable driven member operatively connected with a part to be actuated, independent fluid pressure chambers located relatively opposite to said member, a supply of pressure fluid, a double acting control valve, a passageway to each of said chambers and normally closed by said valve to thereby lock said member by the confined pressure fluid in said chambers, manual operating means, differential mechanism intermediate said movable member, valve and manual operating means, said operating means acting to operate said valve to open said passageways whereby to unlock said member and simultaneously admit pressure fluid to one of said chambers and discharge pressure fluid from the other chamber to thereby actuate said part and means whereby to subject said valve directly to the supply fluid pressure whereby to effect a retroactive influence upon said manual operating means in direct proportion to the power required for said actuation, said differential mechanism being arranged to transmit the physical power which is required to preponderate said retroactive influence and to thereby assist said fluid pressure actuation and to transmit sole physical power for operation of said part in case of fluid pressure supply failure, said valve acting to close said passageways by the retroactive influence of the supply fluid pressure to thereby lock said member concurrently with the stopping of the operation of said manual operating means and means whereby limiting the effect of said supply fluid pressure upon said valve to thereby stop reactions upon said control means during the non-operating position of the valve.

9. In a power operated follow-up mechanism, a supply of pressure fluid, a fluid pressure actuator having a driven member operatively connected with a part to be actuated, said member being normally positively locked in its assumed position by the pressure fluid confined in said actuator, a fluid pressure control valve normally held in inoperative position by resilient means to close conduits communicating with said actuator, control means for said valve including a differential mechanism having fulcrum upon a part movable with said driven member, manual operating means for said control means including a worm drive to move said valve into operating position whereby to cause actuation of said part by said actuator and in synchronism with the manual operation of said worm drive, and means directly subjected to the influence of the supply fluid pressure and acting upon said valve whereby counteracting the manual operation of said worm in proportion to the actuator actuating fluid pressure and to operate said valve to thereby close said conduits in coaction with said resilient means concurrently with the stopping of the manual operation of said worm.

10. In combination with a power actuated actuator, of a mechanism operatively connected thereto for control and normally locked immovably thereby, manually operable control means for releasing the locking effect of said actuator upon said mechanism and to direct the power to cause an actuation thereof, means directly influenced by the actuating power for effecting a retroactive influence upon the manually operated means and in direct proportion to the actuating power, and to automatically restore said control means to a locking position and to stop the retroactive effect concurrently with the stopping of the manual operation.

11. In combination, a fluid pressure actuator connected with a mechanism to be operated, a supply of pressure fluid, valve means for controlling said pressure fluid and having communication with said actuator, yielding resistance means for normally holding said valve means in neutral position to thereby close said communication, manual control means having fulcrum upon a movable part actuated by the actuator for operating said valve means into a fluid diverting position to actuate said actuator and for maintaining said valve means in said position during a continued manual operation in one direction for effecting synchronized operation of said actuator with said manual control means and means directly influenced by the fluid pressure actuating the actuator for effecting a retroactive force against the movements of and upon said valve means, which is directly proportional to the resistance of said mechanism upon said actuator, said fluid pressure influence means acting to restore said valve means to neutral position concurrently with the stopping of the manual operation to thereby irreversibly lock said actuator by said closed communication and whereby to stop the retroactive force upon the manual control means and from reactions of said mechanism upon the actuator when the manual control is not in active operation.

12. In combination with a mechanism, a power actuator operatively connected for the operation of said mechanism, said actuator normally locking said mechanism in a predetermined position, manually operable control means for the actuator to effect operation of said mechanism in either direction from said predetermined position, means directly subjected to said actuating power for automatically effecting a retroactive influence upon said control means, when and only when said control means are manually operated to cause operation of said mechanism, said retroactive influence being directly proportional to the mechanism operating power, and resilient means acting independently of the manual operation and upon said control means for automatically reversing the power effective upon said actuator to thereby cause a return movement of said mechanism to predetermined position when said control means are released by the operator, said independently acting means preponderating the proportionate retroactive effect of the power required to cause said automatic return movement.

13. A follow-up mechanism comprising a fluid pressure actuator operatively connected with a part to be actuated and normally held by said actuator in a predetermined position, a supply of pressure fluid, a double acting fluid pressure control valve, manual operating means having operative connections with said actuator and said valve whereby to operate said valve to cause an operation of said part in a direction away from said predetermined position and in synchronism with the manual operation, means directly influenced by the actuator actuating fluid pressure to counteract the operation of said valve in direct proportion to the power required for actuating said part in said direction and to return said valve to non-operating position simultaneously with the stopping of the manual operation of said operating means, a cam element subjected to movements relative to the movements of the actuator and having a neutral position corresponding to said predetermined position of said part, and spring pressed means, adjusting means for the spring pressure, said spring pressed means acting under the influence of said cam to automatically operate said valve to cause a reversed fluid pressure actuation of said part towards said predetermined position, when said manually operating means are being released by the operator to automatically follow up the movement of the actuator by the action of said springs, said spring pressed means preponderating the counteraction of said fluid pressure influence means to thereby limit the maximum fluid pressure effective for said reversed actuation in direct proportion to the preadjusted pressure of said springs, the counteractive influence acting in a similar manner to said first named operation upon a reversed manual operation of said operating means.

14. In combination with a mechanism, a fluid pressure operated actuator operatively connected for operating said mechanism in opposite directions from a central position, a double acting valve for controlling the fluid pressure influence upon said actuator and communications therebetween which are closed during the neutral position of and by the valve to effectively block said actuator by the enclosed fluid pressure and to check reactions from said mechanism, manual control means operatively connected with said actuator and said valve whereby to operate said valve to cause a fluid pressure actuation of said mechanism in a direction away from said central position and in synchronism therewith, and means influenced by the actuating fluid pressure for impressing a retroactive influence upon said valve to be counteracted by the manual operation and directly proportional to the power required for said actuation, said fluid pressure influenced means acting to close said valve automatically and concurrently with the stopping of the manual control, oppositely acting spring pressed cam elements acting under the influence of the operating position of said actuator relative to said central position to operate said valve for a reversed actuator actuation to thereby automatically return said mechanism to said central position when said manual control means are being released by the operator, said spring pressed cam element counteracting the retroactive influence during said reversed actuation to automatically limit the maximum fluid pressure effect in direct proportion to the pressure of said springs, said counteractive influence acting in a similar way as in said first-named operation upon a reversed manual operation of said control means.

JOHN J. KUNDIG.